(12) United States Patent
Um et al.

(10) Patent No.: US 9,323,102 B2
(45) Date of Patent: Apr. 26, 2016

(54) RESIN COMPOSITION, OPTICAL FILM FORMED USING THE SAME, POLARIZING PLATE AND LIQUID CRYSTAL DISPLAY DEVICE INCLUDING THE SAME

(71) Applicant: LG CHEM, LTD., Seoul (KR)

(72) Inventors: Jun-Geun Um, Daejeon (KR); Nam-Jeong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 173 days.

(21) Appl. No.: 14/035,218

(22) Filed: Sep. 24, 2013

(65) Prior Publication Data

US 2014/0016196 A1 Jan. 16, 2014

Related U.S. Application Data

(63) Continuation of application No. PCT/KR2013/004790, filed on May 31, 2013.

(30) Foreign Application Priority Data

Jun. 1, 2012 (KR) .................. 10-2012-0059449
May 31, 2013 (KR) .................. 10-2013-0062199

(51) Int. Cl.

| C08L 39/04 | (2006.01) |
|---|---|
| C08L 33/06 | (2006.01) |
| C08L 69/00 | (2006.01) |
| G02F 1/1335 | (2006.01) |
| C08F 20/10 | (2006.01) |
| C08F 226/06 | (2006.01) |
| G02B 1/04 | (2006.01) |
| C08J 5/18 | (2006.01) |
| C08F 220/14 | (2006.01) |
| C08F 220/18 | (2006.01) |
| G02B 5/30 | (2006.01) |

(52) U.S. Cl.
CPC .......... *G02F 1/133528* (2013.01); *C08F 20/10* (2013.01); *C08F 226/06* (2013.01); *C08J 5/18* (2013.01); *C08L 33/062* (2013.01); *C08L 39/04* (2013.01); *C08L 69/00* (2013.01); *G02B 1/04* (2013.01); *C08F 220/14* (2013.01); *C08F 220/18* (2013.01); *C08J 2333/10* (2013.01); *C08J 2333/12* (2013.01); *C08J 2333/24* (2013.01); *C08J 2339/04* (2013.01); *G02B 5/3033* (2013.01)

(58) Field of Classification Search
None
See application file for complete search history.

(56) References Cited

U.S. PATENT DOCUMENTS

| 4,093,571 A * | 6/1978 | Gordon ..................... B01F 3/00 521/64 |
|---|---|---|
| 2008/0118752 A1 | 5/2008 | Inoue et al. |
| 2009/0087650 A1* | 4/2009 | Inoue ................. C08G 18/6254 428/336 |
| 2010/0040806 A1 | 2/2010 | Suzuki et al. |

FOREIGN PATENT DOCUMENTS

| CN | 101256360 A | 9/2008 |
|---|---|---|
| CN | 102854746 A | 1/2013 |
| JP | 2008-216491 A | 9/2008 |
| JP | 2009-9125 A | 1/2009 |
| JP | 2009-274256 A | 11/2009 |
| JP | 2009-300918 A | 12/2009 |
| JP | 2010-540693 A | 12/2010 |
| JP | 4721368 B2 | 4/2011 |
| JP | 2012-514759 A | 6/2012 |
| JP | 2012-518052 A | 8/2012 |
| JP | 2013007866 A | 1/2013 |
| JP | 2013011695 A | 1/2013 |
| KR | 10-2010-0014689 A | 2/2010 |
| KR | 1020130002280 | 1/2013 |
| WO | 2010/079920 A2 | 7/2010 |

OTHER PUBLICATIONS

Hawley's Condensed Chemical Dictionary 13th Ed; 1997; p. 34.*

* cited by examiner

*Primary Examiner* — David Buttner
(74) *Attorney, Agent, or Firm* — Dentons US LLP

(57) ABSTRACT

There are provided a resin composition and an optical film using the same. The resin composition includes a copolymer (A) formed by polymerizing a (meth)acryloyl morpholine-based monomer (a), a maleimide-based monomer (b), and an alkyl(meth)acrylate-based monomer (c), and the optical film is manufactured using the same. The resin composition may provide a film having excellent optical properties and optical transparency, reduced haze, excellent mechanical strength, a relatively low level of thermal expansion coefficient leading to a relatively small change in a dimension, and a relatively low level of alteration in a retardation value due to external stress.

15 Claims, No Drawings

RESIN COMPOSITION, OPTICAL FILM FORMED USING THE SAME, POLARIZING PLATE AND LIQUID CRYSTAL DISPLAY DEVICE INCLUDING THE SAME

CROSS-REFERENCE TO RELATED APPLICATIONS

This application is a Continuation Bypass Application of International Patent Application No. PCT/KR2013/004790, filed May 31, 2013, and claims the benefit of Korean Patent Application No. 10-2013-0062199 filed on May 31, 2013, and Korean Patent Application No. 10-2012-0059449 filed on Jun. 1, 2012, in the Korean Intellectual Property Office, the disclosures of which are incorporated herein by reference.

BACKGROUND OF THE INVENTION

1. Field of the Invention

Aspects of embodiments relate to a resin composition and an optical film formed using the same, and more particularly, to a resin composition including a copolymer formed by polymerizing a (meth)acryloyl morpholine-based monomer, a maleimide-based monomer and an alkyl(meth)acrylate-based monomer, an optical film formed using the same, a polarizing plate and a liquid crystal display device including the same.

2. Description of the Related Art

A liquid crystal display consumes a relatively small amount of power, has a small volume, is lightweight and has ease of portability as compared to a cathode ray tube display, and thus, the supply thereof as an optical display device has increased. In general, a liquid crystal display has a basic configuration in which a polarizing plate is installed on both sides of a liquid crystal cell, and an alignment of a liquid crystal cell is changed depending on whether an electrical field is applied to a driving circuit, and properties of light transmitted through polarizing plates are varied to thereby obtain visualization of light.

Such a polarizing plate is generally configured of a polarizer and a protective film. Here, the polarizer is generally formed by adsorbing iodine or dichroic dye on a hydrophilic polymer such as polyvinyl alcohol (PVA) or the like to be stretched and oriented thereon. On the other hand, the protective film is used to increase durability and mechanical properties of a polarizer, and may be adhered to the polarizer by interposing an adhesive between one surface of the polarizer or both surfaces thereof and the protective film.

Meanwhile, in the case of the protective film, a film having characteristics of a relatively low amount of retardation may be used so as not to alter optical properties of the polarizer, and specifically, retardation in a surface direction and a thickness direction of the optical film may be maintained at a level of zero (0). However, general optical films have a problem in that a retardation value thereof may be varied to some extent due to external stress.

In addition, since a polarizer is highly sensitive to moisture and heat, the dimension of a polarizer may be easily varied by external environments, and as a result, a curling phenomenon in which the polarizer is warped may occur and a phenomenon in which light is leaked may occur thereby. Such a phenomenon in which light is leaked may be a principal factor in degrading a display quality of a screen, suppressing the occurrence of curling characteristics in a polarizing plate may be very important in the technical field of displays.

SUMMARY OF THE INVENTION

An aspect of an embodiment provides a resin composition for an optical film, having a relatively low thermal expansion coefficient, to be able to suppress the occurrence of curling in a polarizing plate, an optical film and a polarizing plate manufactured using the same, and a liquid crystal display device including the same.

An aspect of an embodiment provides a resin composition including a copolymer (A) formed by polymerizing a (meth)acryloyl morpholine-based monomer (a), a maleimide-based monomer (b) and an alkyl(meth)acrylate-based monomer (c).

Meanwhile, the copolymer (A) may include the (meth)acryloyl morpholine-based monomer (a) in an amount of 0.5 to 40 parts by weight, the maleimide-based monomer (b) in an amount of 1 to 15 parts by weight, and the alkyl(meth)acrylate-based monomer (c) in an amount of 50 to 98 parts by weight, with respect to 100 parts by weight of the copolymer.

The (meth)acryloyl morpholine-based monomer may be at one selected from a group consisting of methacryloyl morpholine, acryloyl morpholine and phenyl acryloyl morpholine.

The maleimide-based monomer may be at least one selected from a group consisting of methylmaleimide, ethylmaleimide, propylmaleimide, isopropyl maleimide, butylmaleimide, allylmaleimide, benzylmaleimide, cyclohexylmaleimide, phenylmaleimide, nitrophenyl maleimide, hydroxymaleimide, methoxymaleimide, ethoxymaleimide, monochlorophenyl maleimide, dichlorophenyl maleimide, monomethylphenyl maleimide, dimethyl phenyl maleimide, and ethylmethylphenyl maleimide.

The alkyl(meth)acrylate-based monomer may be at least one selected from a group consisting of methylacrylate, ethylacrylate, methyl methacrylate, ethyl methacrylate, methyl ethacrylate, hydroxyethyl methacrylate and cyclohexyl methacrylate.

The copolymer (A) may further include a styrene-based monomer, as a comonomer, and in this case, the styrene-based monomer may have the content of 0.1 to 5.0 parts by weight with regard to 100 parts by weight of the copolymer.

The styrene-based monomer may be at least one selected from a group consisting of styrene, α-methylstyrene, p-bromostyrene, p-methylstyrene and p-chlorostyrene.

Meantime, the resin composition may further include a polycarbonate (B) resin as necessary. The polycarbonate (B) having the content of 0.5 to 5 parts by weight with respect to the total amount of 100 parts by weight of the resin composition may be included in the resin composition. In this case, since an absolute value of retardation in a surface direction of an optical film manufactured using the resin composition and an absolute value of retardation in a thickness direction thereof may be respectively adjusted to be equal to 5 nm or less, the protective film may be usefully applied.

The resin composition may be a compounding resin.

An aspect of an embodiment provides an optical film manufactured using the resin composition described above, and the optical film may be a protective film for a polarizer.

An aspect of an embodiment provides a polarizing plate and a liquid crystal display device including the optical film described above.

DETAILED DESCRIPTION OF THE INVENTION

Embodiments will now be described in detail with reference to the accompanying drawings. Embodiments may, however, be embodied in many different forms and should not be construed as being limited to embodiments set forth herein. Rather, these embodiments are provided so that this disclosure will be thorough and complete, and will fully convey the scope of the inventive concept to those skilled in the art.

According to an embodiment of the inventive concept, a resin composition may include a copolymer (A) formed by polymerizing a (meth)acryloyl morpholine-based monomer (a), a maleimide-based monomer (b) and an alkyl(meth)acrylate-based monomer (c).

Here, the copolymer refers to a case in which elements mentioned above as monomers are polymerized to be included as repetitive units in a copolymer resin. The copolymer may be a block copolymer or a random copolymer, but should not be considered to be limiting. In addition, the copolymer (A) is not limited to a ter-copolymer, and other monomers in addition to the above-mentioned monomers may be included as comonomers without deviating from the scope of the inventive concept.

Retardation characteristics of an optical film manufactured, based on respective monomer properties, as described above may be altered depending on the composition of respective components, an orientation direction, a stretching ratio and a stretching method. Therefore, an optical film may be manufactured by controlling the composition of respective components and a stretching method.

In an embodiment, the (meth)acryloyl morpholine-based monomer (a) has hydrophilic properties in that it easily dissolves in water, and forms physical crosslinks within a polymer through interaction such as hydrogen bond, such that elasticity may be provided to the film manufactured using the resin composition including the (meth)acryloyl morpholine-based monomer as above. When elasticity is increased as described above, a thermal expansion coefficient may be reduced thereby, and when the thermal expansion coefficient is reduced, a change in dimensions is decreased, thereby providing a film having a relatively small amount of alteration in retardation values due to stress.

The (meth)acryloyl morpholine-based monomer (a) refers to a (meth)acryloyl morpholine monomer or a derivative thereof. Specifically, the (meth)acryloyl morpholine monomer may be methacryloyl morpholine or acryloyl morpholine, and specifically, may be acryloyl morpholine. On the other hand, a (meth)acryloyl morpholine derivative may be, for example, substituted or unsubstituted (meth)acryloyl morpholine. In this case, as a substituent substitutable with the (meth)acryloyl morpholine, an alkyl group, an aromatic base, a cyclic group containing a heteroatom, or the like, and specifically, may be phenyl acryloyl morphine or the like.

The content of the (meth)acryloyl morpholine-based monomer (a) may be about 0.5 to 40 parts by weight, based on 100 parts by weight of the copolymer, and specifically, may be about 1 to 30 parts by weight, and more specifically, about 5 to 20 parts by weight. When the (meth)acryloyl morpholine-based monomer (a) is within the range of the content described above, a thermal expansion coefficient of the film may be reduced in proportion to the content. In addition, when the (meth)acryloyl morpholine-based monomer (a) has the content of 20 parts by weight or less, the resin composition and the film may have transparency.

In the embodiment, the maleimide-based monomer (b) may be used to improve thermal resistance of the resin composition and the film and enhance use characteristics for compounding with a polycarbonate resin.

As a detailed example of the maleimide-based monomer (b), at least one selected from a group consisting of methylmaleimide, ethylmaleimide, propylmaleimide, isopropyl maleimide, butylmaleimide, allylmaleimide, benzylmaleimide, cyclohexylmaleimide, phenylmaleimide, nitrophenyl maleimide, hydroxymaleimide, methoxymaleimide, ethoxymaleimide, monochlorophenyl maleimide, dichlorophenyl maleimide, monomethylphenyl maleimide, dimethyl phenyl maleimide, and ethylmethylphenyl maleimide may be used.

The content of the maleimide-based monomer (b) may be about 1 to 15 parts by weight, based on 100 parts by weight of the copolymer, and specifically, may be about 3 to 10 parts by weight. When the maleimide-based monomer is within the range of the content described above, thermal resistance of the resin composition or the film may be improved, and a mixing with the polycarbonate (B) resin may be easily performed, and unveiling of the film may be performed without precipitation.

In the embodiment, the alkyl(meth)acrylate-based monomer (c) may be used to provide a high level of optical characteristics to the resin composition or the film.

The alkyl(meth)acrylate-based monomer (c) may refer to including both of an 'alkyl acrylate-based monomer' and an 'alkyl methacrylate-based monomer'. An alkyl moiety of the alkyl(meth)acrylate-based monomer may have a carbon number ranging from 1 to 6, and specifically, may be a methyl group or an ethyl group. In detail, the alkyl(meth)acrylate-based monomer may be at least one selected from a group consisting of methylacrylate, ethylacrylate, methyl methacrylate, ethyl methacrylate, methyl ethacrylate, hydroxyethyl methacrylate and cyclohexyl methacrylate, but should not be considered to be limiting.

The alkyl(meth)acrylate-based monomer (c) may have the content of about 50 to 98 parts by weight with respect to 100 parts by weight of the copolymer, and more specifically, may have the content of about 65 to 90 parts by weight. When the content thereof is within the range described above, light transmittance of the resin composition or the film may be excellent and thermal resistance may be maintained.

Meanwhile, in the embodiment, the (meth)acryloyl morpholine-based monomer (a) may provide negative birefringence properties and a low level of retardation characteristics in a positive thickness direction, to the optical film. The maleimide-based monomer (b) may provide a low level of positive birefringence properties and retardation (Rth) characteristics in a negative thickness direction to the optical film. On the other hand, the alkyl(meth)acrylate-based monomer (c) may provide retardation (Rth) characteristics in the positive thickness direction and negative birefringence properties to an extent similar to that of the morpholine-based monomer.

Here, the negative birefringence properties refer to characteristics that a refractive index is most significantly increased in a direction perpendicular to an orientation direction at the time of stretching the film, and the positive birefringence properties refer to characteristics that a refractive index is most significantly increased in the orientation direction.

Meanwhile, the retardation value Rin in the surface direction and the retardation value Rth in the thickness direction respectively refer to values defined by the following [Expression 1] and [Expression 2]. The retardation in the negative thickness direction refers to that Rth represented by the following [Expression 2] has a negative value, and the retardation in the positive thickness direction refers to that Rth represented by the following [Expression 2] has a positive value.

$$Rin = (nx - ny) \times d, \quad \text{[Expression 1]}$$

$$Rth = (nz - ny) \times d \quad \text{[Expression 2]}$$

In expressions 1 and 2 above, nx refers to the highest refractive index among refractive indexes in the surface direction of the optical film, ny refers to a refractive index in a direction perpendicular to a direction of nx among refractive indexes in the surface direction of the optical film, nz refers to a refractive index in the thickness direction of the optical film, and d refers to a thickness of the film.

Meanwhile, the copolymer according to an embodiment may further include a styrene-based monomer, that is, as a comonomer, in addition to the monomers described above as required. When the styrene-based monomer is additionally included, polymerization efficiency between monomers may be improved, and therefore, it is expected that residual monomers included in the produced copolymer may be reduced. In addition, a film manufactured using the resin composition including a styrene-based monomer may easily control orientation retardation such that a zero retardation film having excellent birefringence properties may be provided.

When the styrene-based monomer is additionally included, the content thereof maybe 0.1 to 5.0 parts by weight with respect to 100 parts by weight of the copolymer (A). When the content of the styrene-based monomer satisfies the range of content described above, effects thereof may be obtained in light of reducing residual monomers and retardation characteristics.

On the other hand, the styrene-based monomer may be an unsubstituted styrene monomer or a substituted styrene monomer. The substituted styrene monomer may be styrene substituted with a substituent including aliphatic hydrocarbon or heteroatom in a benzene ring or a vinyl group. For example, the substituted styrene monomer may be at least one selected from a group consisting of styrene, α-methylstyrene, 3-methylstyrene, 4-methylstyrene, 2,4-dimethylstyrene, 2,5-dimethylstyrene, 2-methyl-4-chlorostyrene, 2,4,6-trimethyl styrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene and β-bromostyrene, but should not be considered to be limited thereto. Specifically, styrene substituted with C1-4 alkyl or halogen may be used. More specifically, the styrene-based monomer may be obtained using at least one selected from a group consisting of styrene, α-methylstyrene, p-bromostyrene, p-methylstyrene and p-chlorostyrene. More specifically, the styrene-based monomer may be at least one substituent selected from a group consisting of styrene, α-methylstyrene and p-methylstyrene.

According to another embodiment of the inventive concept, a resin composition including the copolymer (A) and the polycarbonate (B) is provided.

The polycarbonate (B) may be added to control retardation and may be included in the resin composition in a content of about 0.5 to 10 parts by weight with respect to 100 parts by weight of the resin composition, and more specifically, may be included therein in a content of about 0.5 to 5 parts by weight. When the polycarbonate (B) is included in the resin composition in an amount smaller than that described above, a problem in that retardation in the thickness direction of the orientation film is increased in a negative direction may occur. When the polycarbonate (B) is included in the resin composition in an amount exceeding that described above, a problem in that the retardation in the thickness direction of the orientation film is increased in a positive direction may occur. Therefore, the content of the polycarbonate may be adjusted according to the composition within the range as described above such that an absolute value of retardation in the surface direction of the orientation film and an absolute value of retardation in the thickness direction thereof may be respectively adjusted to be 5 nm, specifically, 3 nm, and more specifically, 0.

On the other hand, the resin composition including an acrylic copolymer resin and a polycarbonate resin according to the embodiment may be produced using a publicly known method such as, for example, a compounding method.

Further, the resin composition may further include generally used various additives, for example, a lubricant, an antioxidant, a UV stabilizer, a thermostabilizer, or the like, as needed. Here, the additives may be included with an adequate content within a range so as not to influence physical properties of the resin composition, and for example, the content of about 0.1 to 5 parts by weight of the additive with respect to 100 parts by weight of the resin composition may be used.

On the other hand, a glass transition temperature of the resin composition according to the embodiment may be 110° C. or higher, and specifically, may be 120° C. or higher. The glass transition temperature may be 130° C. or lower, but should not be considered to be limited thereto. When the glass transition temperature is less than 110° C., the film may be easily warped under the condition of high temperature and high humidity due to insufficient thermal resistance such that compensation characteristics of the film may be irregular.

In addition, a weight-average molecular weight of the resin composition may range from 50,000 to 500,000 in terms of thermal resistance, process characteristics, productivity, or the like.

Meanwhile, the optical film according to the embodiment may be formed using the resin composition as described above. In detail, the optical film according to the embodiment may be manufactured to include molding the film after obtaining the resin composition as above and may also be manufactured to further include uniaxially or biaxially orienting the film.

When the optical film according to an embodiment is manufactured, any publicly known method may be used, and as an example, a melt extrusion molding method may be used. For example, the resin composition may be vacuum dried to eliminate moisture and dissolved oxygen therefrom, and may then be supplied to a single or twin extruder substituted with nitrogen from a raw-material hopper, and may be melted at a relatively high temperature to thereby obtain raw-material pellets. The obtained raw-material pellets may be vacuum dried and may be melted using a single extruder substituted with nitrogen, from the raw-material hopper to the extruder, and may then be passed through a coat hanger type T-die cast, a chrome plated casting roll, a dry roll, and the like, thereby manufacturing a film. Here, a film molding temperature may range, specifically, from 150 to 350° C., more specifically, 200 to 300° C. On the other hand, as described above, when the film is molded using the T-die method, a publicly known single-axis extruder or biaxial extruder may be provided with a T-die mounted on a fore-end portion thereof, and the extruded film having the form of a film may be wound to thereby form a roll-type film. In this case, the orientation may be applied thereto in an extruded direction by adjusting a temperature of the wound roll to be suitable therefor, such that a single-axis orientation may be obtained. In addition, simultaneous biaxial orientation, consecutive biaxial orientation and the like may be performed by allowing the film to be oriented in a direction perpendicular to the extruded direction.

On the other hand, when a stretching process is performed, a stretching temperature may be within the range approximating the glass transition temperature of a raw material of a film, that is, the resin composition, and specifically, may range from (glass transition temperature-30° C.) to (glass transition temperature+100° C.), more specifically, (glass transition temperature-20° C.) to (glass transition temperature+80° C.). When the stretching temperature is lower than (glass transition temperature-30° C.), the possibility that a sufficient stretching magnification will not be obtained may occur. When the stretching temperature exceeds (glass transition temperature+100° C.), the possibility that a flow of the resin composition will occur and thus a stable stretching process will not be obtained may occur.

The stretching magnification defined by an area ratio may be, specifically, 1.1 to 25 times, more specifically, 1.3 to 10 times. When the stretching magnification is less than 1.1 times, the possibility that toughness accompanied with the stretching is not improved may occur. When the stretching magnification exceeds 25 times, an effect to an extent that the stretching magnification was increased may not be obtained.

A stretching speed may be, specifically, 10 to 20,000%/min, more specifically, 100 to 10.000%/min. When the stretching speed is less than 10%/min, a relatively long period of time may be taken to obtain a sufficient stretching magnification to thereby lead to increase in manufacturing costs. When the stretching speed exceeds 20,000%/min, a rupture or the like may occur in an oriented film.

In order to stabilize optical isotropy or mechanical characteristics of an optical film, the optical film may be subjected to annealing or the like after the stretching process. A condition of an annealing process is not particularly limited. Publicly known suitable conditions may be employed.

The optical film formed using the resin composition according to an embodiment of the inventive concept may have a thickness ranging from 5 to 200 μm, but should not be considered as limiting the scope thereof.

The optical film manufactured using the resin composition according to the embodiment as described above may have a thermal expansion coefficient of 50 to 80 ppm/° C., specifically, 50 to 75 ppm/° C., more specifically, 55 to 70 ppm/° C., and may have a relatively very small amount of difference in a thermal expansion coefficient thereof from that of a polyvinyl alcohol (PVA) polarizing film, thereby effectively suppressing a change in a dimension of a polarizing plate at the time of application thereof to a polarizing plate.

In addition, light transmittance of the optical film may be 90% or more, and haze characteristics thereof may be 2.5% or less and specifically, may be within the range of 1% or less. When the light transmittance of the optical film is less than 90% and the haze thereof exceeds 2.5%, brightness of a liquid crystal display device using the optical film as described above may be reduced.

On the other hand, in the case of the optical film manufactured using the compounding resin of the copolymer (A) and the polycarbonate (B), since an absolute value of the retardation in the surface direction, represented by [Expression 1], and an absolute value of the retardation in thickness direction, represented by [Expression 2], are respectively about 5 nm, specifically, a relatively very small value, about 3 nm, the optical film may be usefully used as a protective film for a polarizing plate.

Another embodiment of the present inventive concept provides a polarizing plate including the optical film according to the embodiment as described above and a liquid crystal display device including the polarizing plate. A detailed description thereof is as follows.

In an embodiment, a polarizing plate refers to a state in which the polarizing plate includes a polarizer and a protective film. As the polarizer, a film configured of polyvinyl alcohol (PVA) containing iodine or dichroic dye may be used. The polarizer may be manufactured by adsorbing iodine or dichroic dye on the PVA film, but the manufacturing method thereof is not particularly limited.

Meanwhile, in the case of the polarizing plate according to an embodiment, a protective film and a polarizer may be adhered thereto using a publicly known method, and for example, using an adhesive scheme using an adhesive. That is, first, an adhesive may be coated on a surface of a protective film or the PVA film, namely, a polarizer (a polarizing film), using a roll coater, a gravure coater, a bar coater, a knife coater, a capillary coater, or the like. The protective film and the polarizer may be adhered to each other through being thermally compressed or compressed at a room temperature using a laminating roll before the adhesive is completely dried. When a hot melt adhesive is used, a heat pressing roll needs to be used.

When the protective film and the polarizer are combined with each other, a usable adhesive may be a PVA adhesive, a polyurethane-based adhesive, an epoxy-based adhesive, a styrene butadiene rubber (SBR) adhesive, a hot melt type adhesive, or the like, but should not be considered to be limited thereto. When the polyurethane-based adhesive is used, a polyurethane-based adhesive produced using an aliphatic isocyanate-based compound not having an influence of light thereon may be used.

In addition, the polarizing plate according to the embodiment may further include an adhesive layer to facilitate the stacking on a liquid crystal cell and the like and the adhesive layer may be disposed on one surface of the polarizing plate or both surfaces thereof. The adhesive layer may be sufficiently cured by heat or ultraviolet light after the adhesion thereof such that mechanical strength may be improved to an extent of an adhesive. Further, interface adhesive strength may also be relatively high to an extent to which delamination does not occur without breakage of one of both films having adhesive films adhered thereto.

A usable adhesive may have excellent optical transparency, wetting properties and cohesiveness suitable for the use thereof, and adhesive properties. As a detailed example, an adhesive produced to appropriately have, as a base polymer, a polymer such as an acrylic polymer or a silicon-based polymer, polyester, polyurethane, polyether, synthetic rubber, or the like may be used.

In addition, according to an embodiment, the liquid crystal display device including the polarizing plate is provided. For example, the liquid crystal display device according to the embodiment may include a liquid crystal cell and a first polarizing plate and a second polarizing plate provided with both surfaces of the liquid crystal cell. At least one of the first and second polarizing plates may be a polarizing plate according to an embodiment of the present inventive concept. That is, at least one or two optical films according to an embodiment of the inventive concept may be provided between the first polarizing plate and the liquid crystal cell, between the second polarizing plate and the liquid crystal cell, or both between the first polarizing plate and the liquid crystal cell and between the second polarizing plate and the liquid crystal cell. The optical film or a polarizer protective film of the polarizing plate provided on a side thereof opposite to the liquid crystal cell of the polarizing plate may include a UV absorbent.

The present invention will now be described in more detail with reference.

1. Production of Resin Composition and Glass Transition Temperature According to an Embodiment of the Inventive Concept.

Embodiment 1

A monomer mixture of 1000 g, formed of methyl methacrylate in an amount of 84 parts by weight, N-cyclohexylmaleimide in an amount of 6 parts by weight, and acryloyl morpholine in an amount of 10 parts by weight was prepared and was mixed with distilled water of 2000 g, a 5% polyvinyl alcohol solution of 8.4 g (POVAL PVA217, Kuraray Co.), boric acid of 0.1 g, normal octyl mercaptan of 2.5 g, and 2,2'-azobisisobutyronitrile of 1.5 g in a 5 liter reactor, to be distributed in the water while being stirred at 400 rpm.

Primary polymerization was performed at 80° C., and the suspension reached 80° C., and then, it was confirmed that a polymerization peak was generated after about 60 minutes. Then, temperature rose to 115° C. and secondary polymerization was carried out for about 40 minutes. After the secondary polymerization, the suspension was cooled to 30° C., and the polymerized resin composition having the form of a bead was cleaned with distilled water to be then dehydrated and dried.

The resin composition obtained as described above was supplied to a 24Φ extruder substituted with nitrogen, from a raw-material hopper to the extruder, and was melted at 250° C. and thus raw-material pellets were produced. As for the produced resin, a glass transition temperature Tg was measured using a DSC and the measurement result is illustrated in Table 1 below.

Embodiment 2

A monomer mixture of 1000 g, formed of methyl methacrylate in an amount of 74 parts by weight, N-cyclohexylmaleimide in an amount of 6 parts by weight, and acryloyl morpholine in an amount of 20 parts by weight was prepared, and polymerization thereof was performed and pellets were produced through the same method as that of <Embodiment 1>, while a glass transition temperature Tg was measured using a DSC. The measurement result is illustrated in Table 1 below.

Embodiment 3

A monomer mixture of 1000 g, formed of methyl methacrylate in an amount of 54 parts by weight, N-cyclohexylmaleimide in an amount of 6 parts by weight, and acryloyl morpholine in an amount of 40 parts by weight was prepared and, polymerization thereof was performed and pellets were produced through the same method as that of <Embodiment 1>, while a glass transition temperature Tg was measured using a DSC. The measurement result is illustrated in Table 1 below.

Embodiment 4

A monomer mixture of 1000 g, formed of methyl methacrylate in an amount of 84 parts by weight, N-cyclohexylmaleimide in an amount of 6 parts by weight, and acryloyl morpholine in an amount of 10 parts by weight was prepared, and polymerization thereof was performed through the same method as that of <Embodiment 1>. Then, the resin composition was obtained by uniformly mixing a polycarbonate resin therewith at a weight ratio of 98:2 with regard to a ratio of the resin composition to polycarbonate, and raw-material pellets were produced using the same method as that of <Embodiment 1>, while a glass transition temperature Tg was measured using a DSC. The measurement result is illustrated in Table 1 below.

Comparative Example 1

A monomer mixture of 1000 g, formed of methyl methacrylate in an amount of 94 parts by weight and N-cyclohexylmaleimide in an amount of 6 parts by weight was prepared, and polymerization thereof was performed and pellets were produced in the same method as that of <Embodiment 1>, while a glass transition temperature Tg was measured using a DSC. The measurement result is illustrated in Table 1 below.

Comparative Example 2

A methyl methacrylate monomer of 1000 g was prepared, and raw-material pellets were produced through the same method as that of <Embodiment 1>, while a glass transition temperature Tg was measured using a DSC. The measurement result is illustrated in Table 1 below.

TABLE 1

|  | Polymerization Ratio (%) | Tg(° C.) |
|---|---|---|
| Embodiment 1 | 84:6:10 | 126 |
| Embodiment 2 | 74:6:20 | 128 |
| Embodiment 3 | 54:6:40 | 130 |
| Embodiment 4 | 84:6:10, PC 2% | 126 |
| Comparative Example 1 | 94:6 124 | 124 |
| Comparative Example 2 | 100:0 | 108 |

2. Manufacturing of Optical Film and Physical Properties Evaluation

The raw-material pellets obtained through embodiments 1 to 4 and comparative examples 1 and 2 above were vacuum dried and were melted at 250° C. using an extruder. The resultant pellets were passed through a coat hanger type T-die, a chrome plated casting roll, a dry roll, and the like. Whereby, the optical film having the thickness of 200 μm was manufactured.

The optical film above was oriented at a speed of 200 mm/min at 113 to 133° C., a condition of temperature higher 5° C. than the glass transition temperature Tg of the respective film, using experimental film orientation equipment, and therefore, a biaxially oriented film was manufactured. Here, stretching ratios in MD and TD directions are shown in table 2 below.

In the embodiment, a physical property evaluating method is described below and the results thereof are illustrated in table 2 below.

(1) Retardation Value

Retardation of the film measured as above was measured using a birefringence meter (Axoscan, Axometrics Inc.), and wavelength was measured at 500 nm.

(2) Thermal Expansion Coefficient

The thermal expansion coefficient was measured in a section ranging from 30 to 160° C. under a speed condition of 100° C./min, using a thermal mechanical analyzer (TMA: Mettler Toledo, SDTA840). The measured thermal expansion coefficient of the film does not refer to volumetric expansion, but refers to a linear expansion, that is, refers to a lengthwise expansion of the film depending on an increase of 1° C. in temperature in an MD or TD direction of the film. In this case, the change in the temperature and the length refers to linear relationship.

(3) Haze Value

A haze value was measured using HAZEMETER HM-150 by Murakami color Research Laboratory Co., Ltd.

TABLE 2

| Film Law Material, Pellets | Stretching Temperature (° C.) | Stretching Ratio (%) MD | Stretching Ratio (%) TD | Thickness (μm) | Retardation (nm) Rin | Retardation (nm) Rth | Thermal Expansion Coefficient (ppm/° C.) | Haze (%) |
|---|---|---|---|---|---|---|---|---|
| Embodiment 1 | 131 | 100 | 100 | 60 | 3.4 | −32.8 | 67 | 0.1 |
| Embodiment 2 | 133 | 100 | 100 | 60 | 4.1 | −38.1 | 61 | 0.1 |
| Embodiment 3 | 135 | 100 | 100 | 60 | 5.3 | −37.3 | 62 | 0.2 |
| Embodiment 4 | 131 | 100 | 100 | 60 | 0.6 | −1.2 | 69 | 0.1 |
| Comparative Example 1 | 129 | 100 | 100 | 60 | 2.1 | −36.7 | 82 | 0.1 |
| Comparative Example 2 | 113 | 100 | 100 | 60 | 2.8 | −40.4 | 80 | 0.1 |

As illustrated in table 2 above, in comparing embodiments 1 to 3 to comparative example 1, when the acryloyl morpholine-based monomer is included within a copolymer, it could be confirmed that the thermal expansion coefficient of the film was significantly reduced.

In addition, in comparing embodiment 4 and embodiment 1 to each other, when a polycarbonate was compounded, it was confirmed that the retardation of the orientation film could be adjusted to be at a zero level.

Further, it could be confirmed that the optical films manufactured through embodiments 1 to 4 according to the inventive concept had excellent transparency.

As set forth above, a resin composition according to an embodiment of the inventive concept may provide a film having excellent optical properties and optical transparency, reduced haze, excellent mechanical strength, and a relatively low thermal expansion coefficient leading to a relatively small change in dimensions, depending on an alteration in an external temperature. Accordingly, an optical film manufactured using the resin composition according to the embodiment may be variously used in an information electronic device such as a display device or the like.

While the inventive concept has been shown and described in connection with embodiments, it will be apparent to those skilled in the art that modifications and variations can be made without departing from the spirit and scope of the present inventive concept as defined by the appended claims.

What is claimed is:

1. A resin composition comprising: a copolymer (A) formed by polymerizing a (meth)acryloyl morpholine-based monomer (a), a maleimide-based monomer (b), and at least one of an alkyl(meth)acrylate-based monomer, a hydroxylethylmethacrylate or a cyclohexylmethacrylate (c), and further comprising polycarbonate (B).

2. The resin composition of claim 1, wherein the copolymer (A) includes the (meth)acryloyl morpholine-based monomer (a) in an amount of 0.5 to 40 parts by weight, the maleimide-based monomer (b) in an amount of 1 to 15 parts by weight, and the alkyl(meth)acrylate-based monomer (c) in an amount of 50 to 98 parts by weight, with respect to 100 parts by weight of the copolymer.

3. The resin composition of claim 1, wherein the (meth)acryloyl morpholine-based monomer is at one selected from a group consisting of methacryloyl morpholine, acryloyl morpholine and phenyl acryloyl morpholine.

4. The resin composition of claim 1, wherein the maleimide-based monomer is at least one selected from a group consisting of methylmaleimide, ethylmaleimide, propylmaleimide, isopropyl maleimide, butylmaleimide, allylmaleimide, benzylmaleimide, cyclohexylmaleimide, phenylmaleimide, nitrophenyl maleimide, hydroxymaleimide, methoxymaleimide, ethoxymaleimide, monochlorophenyl maleimide, dichlorophenyl maleimide, monomethylphenyl maleimide, dimethyl phenyl maleimide, and ethylmethylphenyl maleimide.

5. The resin composition of claim 1, wherein the alkyl (meth)acrylate-based monomer is at least one selected from a group consisting of methylacrylate, ethylacrylate, methyl methacrylate, ethyl methacrylate, and methyl ethacrylate, hydroxyethyl methacrylate and cyclohexyl methacrylate.

6. The resin composition of claim 1, wherein the copolymer (A) further includes a styrene-based monomer, as a comonomer.

7. The resin composition of claim 6, wherein the styrene-based monomer has the content of 0.1 to 5.0 parts by weight with respect to 100 parts by weight of the copolymer.

8. The resin composition of claim 6, wherein the styrene-based monomer is at least one selected from a group consisting of styrene, α-methylstyrene, p-bromostyrene, p-methylstyrene and p-chlorostyrene.

9. The resin composition of claim 1, wherein the content of the polycarbonate (B) is 0.5 to 5 parts by weight with respect to the total amount of 100 parts by weight of the resin composition.

10. An optical film manufactured using the resin composition of claims 1.

11. The optical film of claim 10, wherein the optical film has a thermal expansion coefficient of 50 to 80 ppm/° C.

12. The optical film of claim 10, wherein an absolute value of retardation Rin in a surface direction of the orientation film defined by the following
[Expression 1], and an absolute value of retardation Rth in a thickness direction thereof defined by the following [Expression 2] are respectively 5 nm or lower, $$Rin=(nx-ny)\times d, \quad\quad\quad \text{[Expression 1]}$$

$$Rth=(nz-ny)\times d \quad\quad\quad \text{[Expression 2]}$$

wherein in expressions 1 and 2 above, nx refers to the highest refractive index among refractive indexes in the surface direction of the optical film, ny refers to a refractive index in a direction perpendicular to a direction of nx among refractive indexes in the surface direction of the optical film, nz refers to a refractive index in the thickness direction, and d refers to a thickness of the film.

13. The optical film of claim 12, wherein the optical film is a protective film for a polarizer.

14. A polarizing plate comprising:
a polarizer; and the optical film of claim 10, disposed on at least one surface of the polarizer.

15. A liquid crystal display device comprising the polarizing plate of claim 14.

* * * * *